(12) United States Patent
Yuyama et al.

(10) Patent No.: US 6,394,308 B1
(45) Date of Patent: May 28, 2002

(54) TABLET FEEDER

(75) Inventors: Shoji Yuyama; Shinichi Honda; Hiroyasu Hamada, all of Osaka (JP)

(73) Assignee: Kabushiki Kaisha Yuyama Seisakusho, Osaka (JP)

( * ) Notice: Subject to any disclaimer, the term of this patent is extended or adjusted under 35 U.S.C. 154(b) by 0 days.

(21) Appl. No.: 09/481,491

(22) Filed: Jan. 12, 2000

(30) Foreign Application Priority Data

Jan. 14, 1999 (JP) ............................................. 11-007913

(51) Int. Cl.[7] ........................... B65G 59/00; B65H 3/02; G07F 11/16
(52) U.S. Cl. ........................ 221/265; 221/263; 221/264; 221/119; 221/122; 221/121; 53/155
(58) Field of Search ................................. 221/269, 263, 221/264, 119, 122, 121

(56) References Cited

U.S. PATENT DOCUMENTS

| | | | | |
|---|---|---|---|---|
| 3,722,740 A | * | 3/1973 | List ............................... 221/7 |
| 5,280,845 A | * | 1/1994 | Leight ........................... 221/2 |
| 5,322,185 A | * | 6/1994 | Leight ........................... 221/2 |
| 5,472,113 A | * | 12/1995 | Shaw ............................ 221/7 |
| 5,765,606 A | * | 6/1998 | Takemasa et al. ........... 141/104 |
| 5,803,309 A | * | 9/1998 | Yuyama et al. ................ 221/82 |
| 5,865,342 A | * | 2/1999 | Ito et al. ....................... 221/265 |
| 5,927,546 A | * | 7/1999 | Yuyama et al. .............. 221/265 |
| 6,073,799 A | * | 6/2000 | Yuyama et al. .............. 221/154 |
| 6,256,963 B1 | * | 7/2001 | Kim .............................. 53/155 |

FOREIGN PATENT DOCUMENTS

| | | | | |
|---|---|---|---|---|
| FR | 70.35002 | * | 6/1971 | ........... B65B/65/00 |
| JP | 9-323702 | * | 12/1997 | ............. B65B/1/30 |

* cited by examiner

*Primary Examiner*—Christopher P. Ellis
*Assistant Examiner*—Michael E Butler
(74) *Attorney, Agent, or Firm*—Wenderoth, Lind & Ponack, L.L.P.

(57) ABSTRACT

A tablet feeder of the type in which tablets in a storage case are discharged by rotating a rotor. The tablet feeder can prevent tablets, which are about to be discharged by slight rotation of the rotor, from being inadvertently discharged when the storage case is mounted on or dismounted from a support base. The storage case is detachably mounted on the support base. The rotor is mounted in a bottom portion of the storage case so as to be rotatable about a rotary shaft, and is coupled to a motor through rotary gears at its bottom end. A plurality of small magnets are provided on the outer circumference of the bottom portion, and small magnets are provided at a plurality of locations on the outer circumference of the rotor at predetermined intervals.

15 Claims, 11 Drawing Sheets

TABLET FEEDER

BACKGROUND OF THE INVENTION

This invention relates to an improvement in a tablet feed mechanism of a tablet feeder for supplying tablets including capsules.

A conventional tablet feeder for supplying tablets to tablet packaging devices is disclosed in unexamined Japanese patent publication 9-323702. The tablet feeder has a rotor rotatably mounted in the bottom of a tablet storage case which is detachably mounted from a horizontal direction with respect to a support base in which is mounted a motor for driving the rotor.

The bottom portion in the storage case is formed into a recess in which is received the rotor of a conical shape so as to be rotatable about its rotation axis. An idler gear is mounted at the bottom end. When the storage case is mounted on the support base, a drive gear at the end of the output shaft of the motor in the support base is adapted to engage the idler gear. The support base is provided with a discharge path for discharging tablets obliquely downwardly. The rotor has along its outer circumference a plurality of pockets into which tablets are dropped. When each pocket aligns with the discharge path, the tablet in the pocket drops and is discharged downwardly.

The tablet feeder is controlled such that tablets in the pockets are dispensed one at a time by rotating the rotor, the dispensed number is counted. When a preset tablet number is reached, the rotor is stopped by stopping the motor. Thus, if the dispensing speed is increased by increasing the speed of the rotor, when the number of tablets has reached the preset number by the sensor detection and the rotor is brought to a sudden stop, the rotor will not necessarily stop precisely at the position where the stop signal has been produced but rotates slightly from this position due to its inertia.

Thus, when the pocket in which is received a tablet following the tablet that has been dispensed last time approaches close to the position of the discharge path and is stopped, although it may not rotate to the position right over the discharge path, it may stop at a position very close to such a position according to the kind of tablets, rotation speed, and various other conditions.

To cope with this problem, the tablet feeder disclosed in the abovesaid publication has at the lower bottom of the tablet storage case a rotation preventive means for preventing rotation of the rotor when the storage case is dismounted, by engaging a drive gear provided on a rotary shaft at the bottom end of the rotor.

However, since the rotation preventive means in the conventional tablet feeder is a means for mechanically preventing rotation of the rotor when the storage case is dismounted from the support base, this means cannot stop the rotor by a stop signal based on tablet detection by a sensor directly at a desired position. Thus, the pocket of the next tablet can stop at a position very close to the discharge path.

Also, the rotation preventive means can merely prevent the rotation of the rotor when the storage case is dismounted. If the engagement of the rotation preventive means is released and the rotor rotates either forwardly or backwardly by a very small distance, e.g. one tooth of the gear when the tablet feeder is replaced with another tablet feeder and the storage case is remounted, the pocket in question may stop at a position very close to the discharge path. The pocket may thus align with it. Thus, tablets may still drop inadvertently.

An object of this invention is to provide a tablet feeder so adapted that the rotor can be stopped at a predetermined position by a stop means having a simple structure when the rotation of the rotor stops, thereby preventing tablets from dropping inadvertently when the storage case is mounted or dismounted.

Another object is to provide a tablet feeder which can prevent the rotor from rotating in a reverse direction, thereby preventing the partitioning member from being damaged.

SUMMARY OF THE INVENTION

According to this invention, there is provided in a tablet feeder comprising a tablet storage case having a bottom portion, a rotor rotatably mounted in the bottom portion of the tablet storage case, and a motor for driving the rotor. The rotor is formed with a plurality of pockets for receiving tablets therein, and when each of the pockets aligns with a discharge path provided under the rotor, the tablets can be discharged. Also, a predetermined position stop means is provided for the purpose of stopping the rotor at a predetermined position.

According to this invention, the storage case in which are stored tablets is detachably mounted on the support table, and the tablets are discharged through the discharge path and supplied to e.g. a drug packaging device. This tablet supply action is performed by rotating the rotor and discharging one tablet every time one of the pockets formed in the rotor outer surface aligns with the discharge path. Such tablet supply action itself is the same as with a conventional tablet feeder.

But when the storage case is dismounted or removed from the support table to replenish the tablets in the tablet feeder, if the rotor is at a stop immediately before the position where a tablet will drop into the discharge path, due to slight shift in meshing of rotary gears, the rotor tends to rotate, so that a tablet can drop inadvertently. Such an accident will not happen in the tablet feeder of this invention.

When the rotor is stopped, a stopping force is applied to the rotor by the predetermined position stop means to stop the rotor at a predetermined position. Once the rotor stops, unless a rotational force that is sufficient to rotate the rotor against the stopping force is applied, it will never rotate. Thus, the rotor cannot easily be rotated due to a shift in meshing of rotary gears while the storage case is being dismounted or even if someone attempts to purposely rotate the rotor. Thus, tablets will never drop inadvertently.

Also, if the partitioning member comprising the whisker-like resilient member for partitioning tablets in the pockets is fixed to the bottom portion at a position facing the discharge path, a reverse rotation preventive means is preferably mounted at the bottom end of the rotary shaft of the rotor. This prevents the whisker-like resilient member from being damaged due to reverse rotation of the rotor.

Other features and objects of the present invention will become apparent from the following description made with reference to the accompanying drawings, in which:

DETAILED DESCRIPTION OF THE PREFERRED EMBODIMENT

Figure 1:
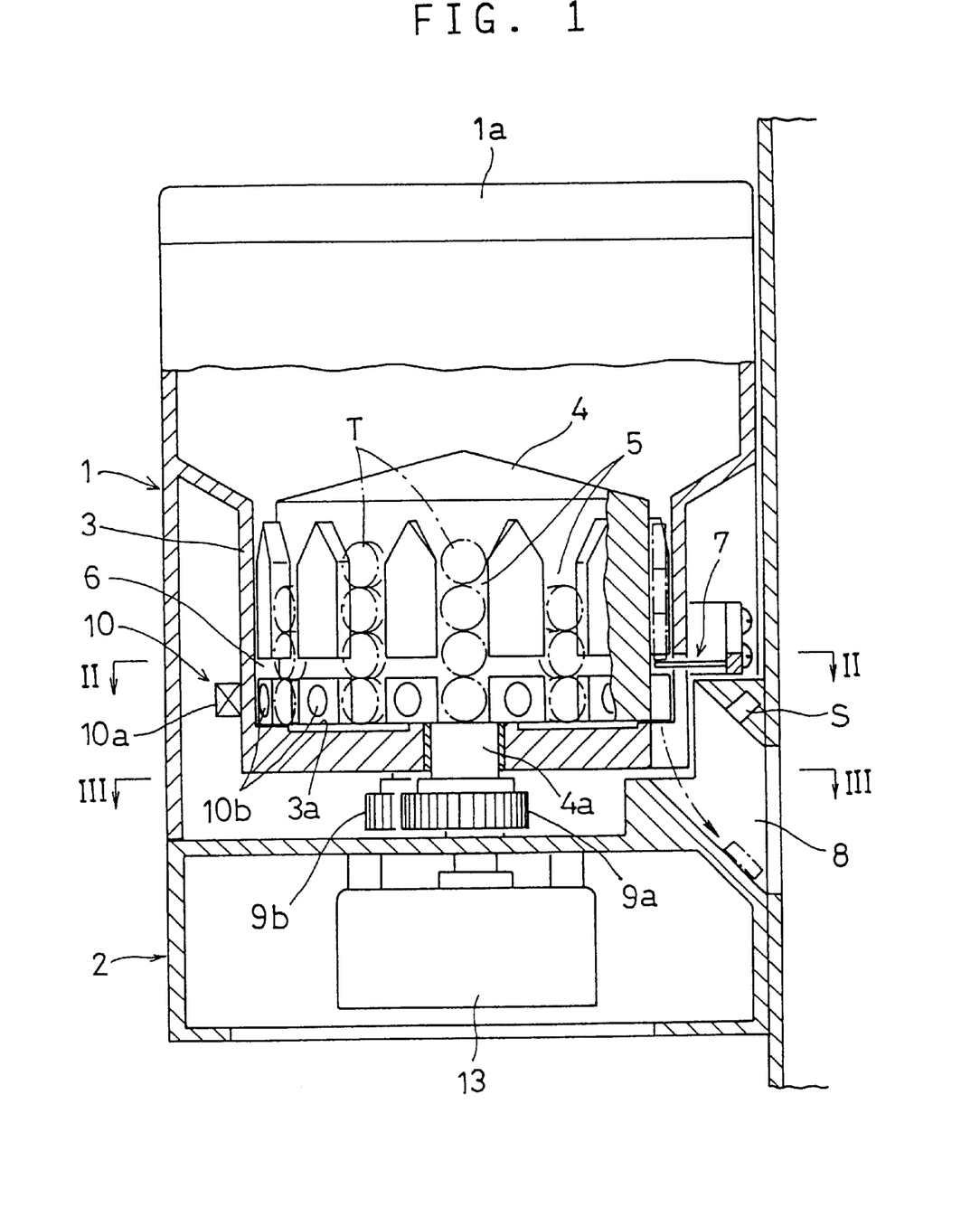
FIG. 1 is a vertical sectional view of a tablet feeder of a first embodiment.

Embodiments of this invention will now be described. FIG. 1 shows a sectional view of a tablet feeder constructed in accordance with a first embodiment of the invention. As shown, the first embodiment comprises a combination of a tablet storage case 1 and a support base 2. The former has an inner bottom portion 3 formed as a recess 3a in which a cylindrical rotor 4 can be rotatably mounted and driven through a rotary shaft 4a with a predetermined gap. The rotor 4 has a short conical top, and a lower cylindrical portion having in its outer surface a plurality of pockets in the shape of vertical guide grooves arranged at angular intervals. Each pocket can receive several (3 or 4) tablets T. Numeral 1a denotes a lid plate of the storage case 1.

The top end of each pocket is flared upwardly so that tablets can be received easily. A partitioning groove 6 extends over the entire circumference of the cylindrical portion of the rotor 4 in its outer circumferential surface near its bottom end. A partitioning member 7, which is described below, is received in the partitioning groove 6 to partition the tablets. The rotary shaft 4a of the rotor 4 extends downwardly through a bottom plate of the bottom portion 3, and carries at its bottom end a rotary gear 9a meshing with another rotary gear 9b.

On the outer circumference of the rotor 4, a plurality of small magnets 10b are provided at equal angular intervals. Also, on the circumference of the vertical wall of the bottom portion 3, a plurality of (two in the embodiment shown) small magnets 10a are provided at corresponding intervals. The corresponding pairs of small magnets 10a, 10b form a stop means 10 for stopping the rotor 4 at a predetermined position. The stop means 10 may be a combination of at least one small magnet 10a and a plurality of small magnets 10b (or magnetizable objects), or a combination of a plurality of small magnets 10a (or magnetizable objects) arranged at corresponding intervals over the entire circumference) and at least one small magnet 10b.

The small magnets 10a are buried with the same one polarity. The small magnets 10b have an opposite polarity relative to the above. However, if the small magnets 10a or 10b are magnetizable objects, the mating magnets may not have the same polarity. The intervals between the small magnets 10a or 10b are preferably equal to the intervals between the pockets 5 on the outer circumference of the rotor 4. With this arrangement, as soon as the rotary driving force of the rotor 4 disappears due to a stop signal, the rotor can be stopped instantly by the attraction force of the stop means nearest to this position.

Figure 3:
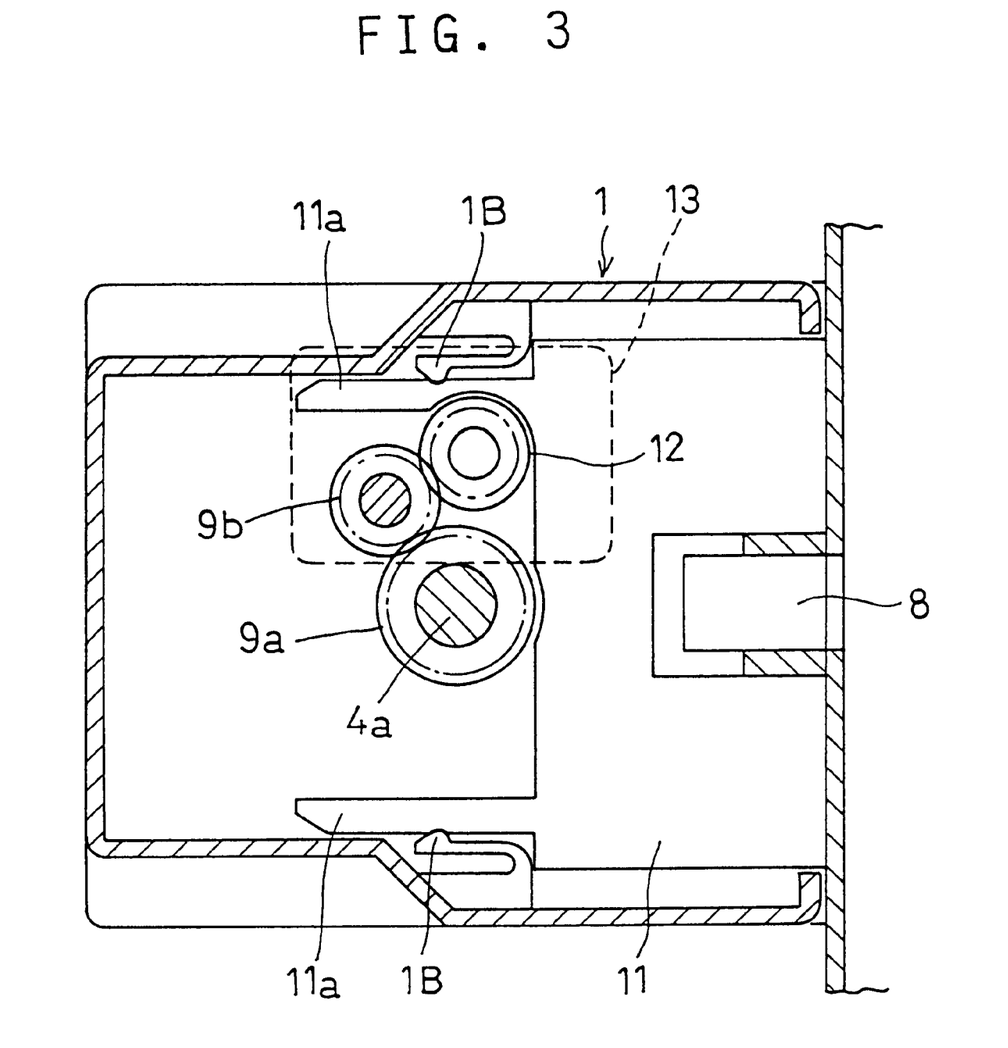
FIG. 3 is a sectional view taken along the line III—III of FIG. 1.

As shown in FIG. 3, a guide plate 11 is provided on the support base 2. At both ends thereof, arms 11a for engaging the storage case 1 are provided. The arms 11a are each formed with a recess. On the other hand, on the inner bottom of the storage case 1, protrusions 1B are provided to sandwich the arms 11a. By engaging the protrusions 1B in the recesses of the arms, the storage case 1 engages the support base 2.

A drive gear 12 is provided at one corner of the guide plate 11. Through its rotary shaft, the power from a motor 13 in the support base 2 is transmitted. The gear 12 meshes with the rotary gear 9b of the storage case 1 to rotate the rotor 4 through another rotary gear 9a. In the guide plate 11, an opening of the discharge path 8 is provided. At a suitable position of the peripheral surface of the discharge path 8, a sensor S (FIG. 1) for detecting the passage of tablets is provided.

Figure 2:
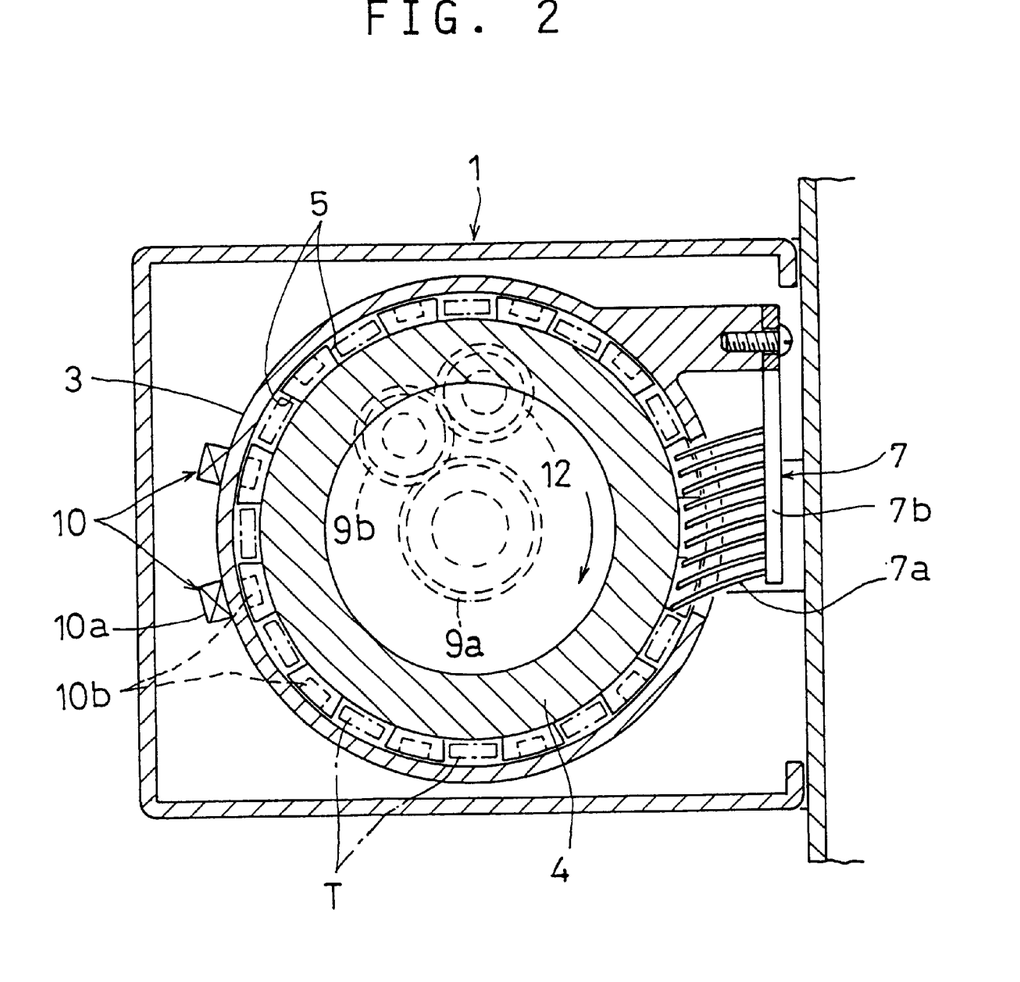
FIG. 2 is a sectional view taken along the line II—II of FIG. 1.

Further, at a position corresponding to the discharge path 8, the partitioning member 7 is provided so as to extend through the vertical wall of the inner bottom plate 3. The partitioning member 7 is formed in the shape of a tooth brush in which whisker-like resilient members 7a are planted in a support arm 7b (FIG. 2). The arm base is fixed to the vertical wall. The whisker-like resilient members 7a are provided with a moderate curve and are slightly inclined in the rotating direction of the rotor 4 in the radial direction. The members 7a have their tips received in the partitioning groove 6 of the rotor 4. By these members 7a, tablets T are partitioned into upper and lower tablets. Due to members 7a, only one "lower" tablet is held in the pocket 5.

The tablet feeder of the first embodiment supplies tablets in the following manner. When the motor 13 is rotated with a required amount of tablets supplied in the storage case 1 of the tablet feeder, which is mounted on the support base 1 with the lid plate 1a closed, the rotor 4 is driven. The whisker-like resilient members 7a received in the partitioning groove 6 of the rotor 4 partition tablets in the approaching pocket 5. When the pocket aligns with the opening of the discharge path 8, the one "lower" tablet under the resilient members 7a will drop into the discharge path 8.

When the rotor 4 further rotates, the whisker-like resilient members 7a are gone. Thus, the now empty lowest space of pocket 5 receives an upper tablet which is now permitted to drop therein. A tablet in the pocket immediately behind (with respect to the rotating direction) the position where the tablet dropped aligns with the discharge path 8 and drops. The tablets in the pockets 5 drop continuously into the discharge path 8 in this way.

Tablets are thus discharged continuously. To dismount or remove the storage case 1 from the support base 2 during feeding or for inspection of the tablet feeder or for replenishing tablets, the motor is stopped to stop the rotation of the rotor 4. With tablets in the pocket, the pocket 5 stops at a position immediately before the discharge path 8. In this embodiment, since the stop means 10 for the rotor 4 is provided between the rotor 4 and the bottom portion 3, the pocket 5 comes to a sudden stop at a predetermined position before the discharge path 8.

This predetermined position is a position where the pocket 5 next to the pocket from which a tablet has been discharged a moment before stops short of the discharge path 8 by a predetermined distance. Thus, a stop signal is produced before the pocket 5 from which a tablet has been discharged passes the discharge path 8 or immediately after it has passed it, so that the rotor 4 stops. The stop signal is produced at such a timing that the next pocket 5 will not advance beyond a distance range within which the attraction force from the stop means 10 at this side of the discharge path 8 by a predetermined distance is effective. Thus the rotor 4 is stopped by the attraction force.

But, even if the rotor 4 advances to a certain degree from the predetermined position due to inertia, it will be pulled back by the attraction force of the stop means 10 to stop the next pocket at the predetermined position. Thus, the next pocket 5 stops at the predetermined position without fail. However, since the stop means 10 is a means based on the magnetic attraction force, it does not mechanically fix the rotor 4. Rather, the rotation of the rotor 4 is stopped elastically. While it is driven by the driving force of the motor, its rotation will not be impaired.

Also, since the stop means 10 stops the rotor at the predetermined position due to the magnetic attraction force, while the rotor 4 is at a stop, it is slightly heavy to turn. Thus, there is no fear of an accident in which resilient members 7a are broken by tablets that have been caught by them even if the storage case 1 is removed and the gears 9a or 9b protruding from its bottom are turned inadvertently in a reverse direction.

Figure 4:
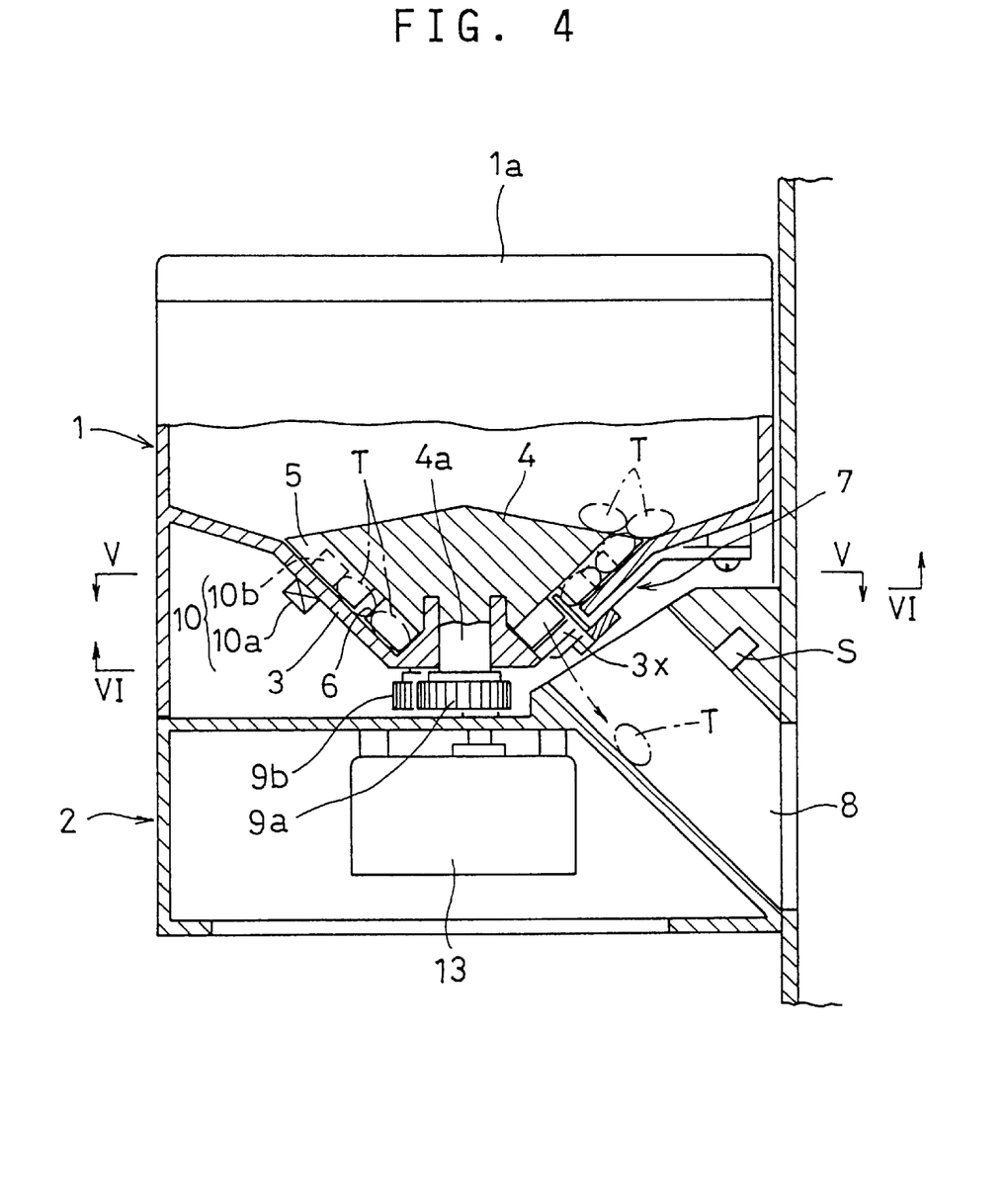
FIG. 4 is a vertical sectional view of a tablet feeder of a second embodiment.
Figure 5:
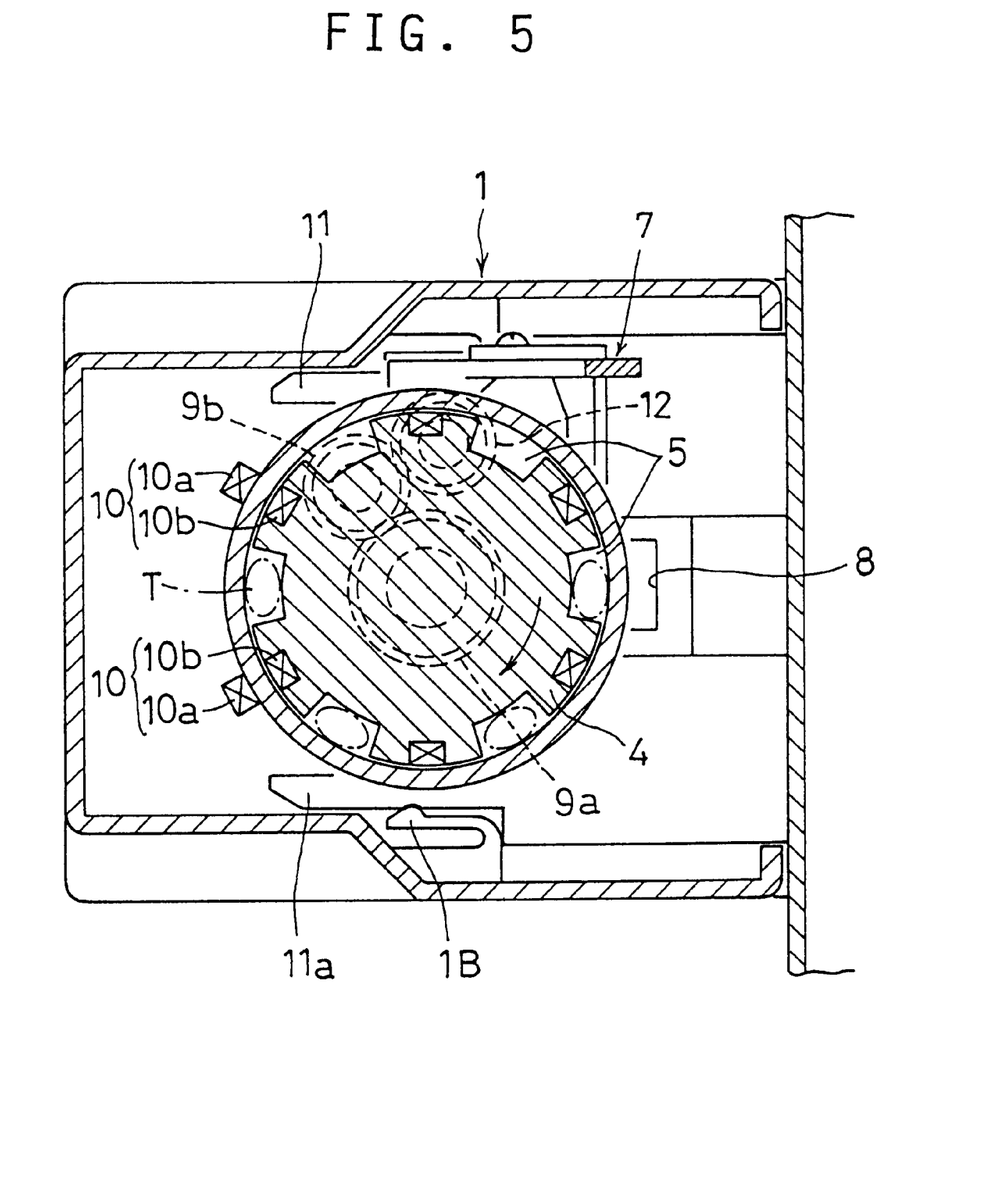
FIG. 5 is a sectional view taken along the line V—V of FIG. 4.
Figure 6A:
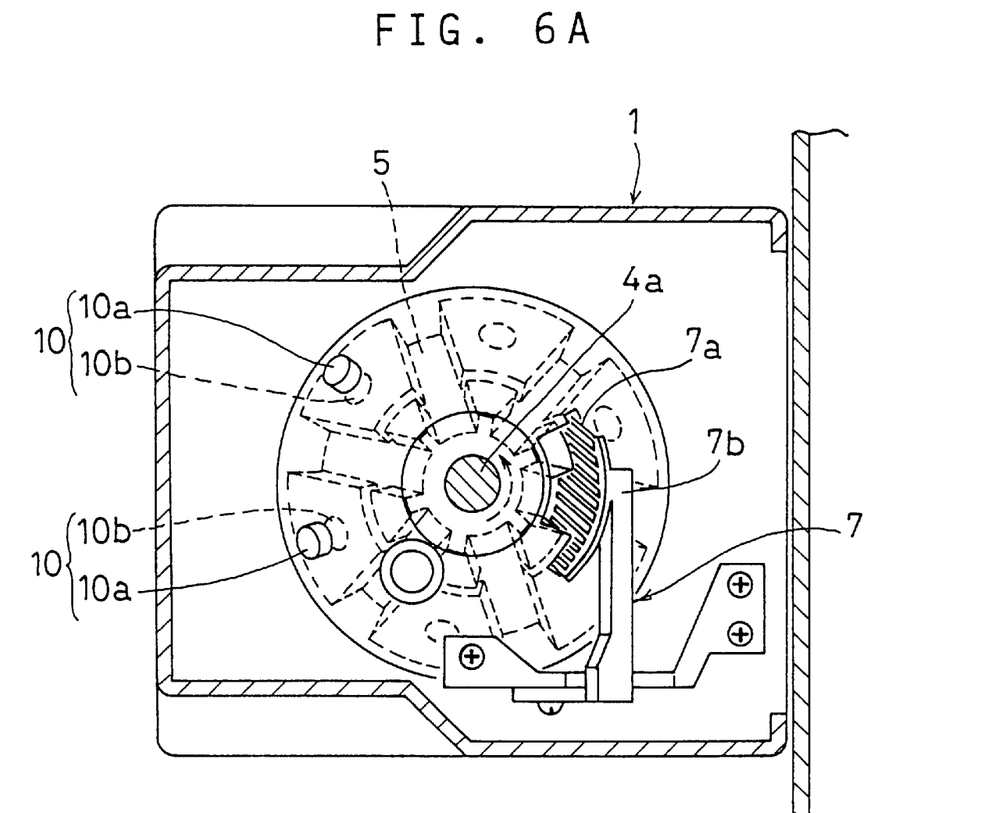
FIG. 6A is a sectional view taken along the line VI—VI of FIG. 4.
Figure 6B:
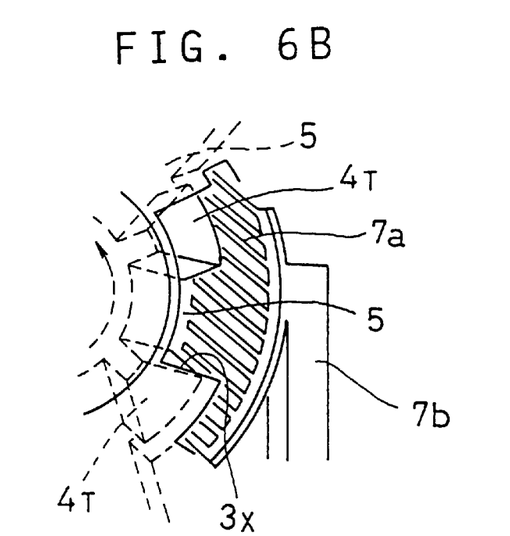
FIG. 6B is an enlarged partial sectional view of the view taken along the line VI—VI of FIG. 4.
Figure 7:
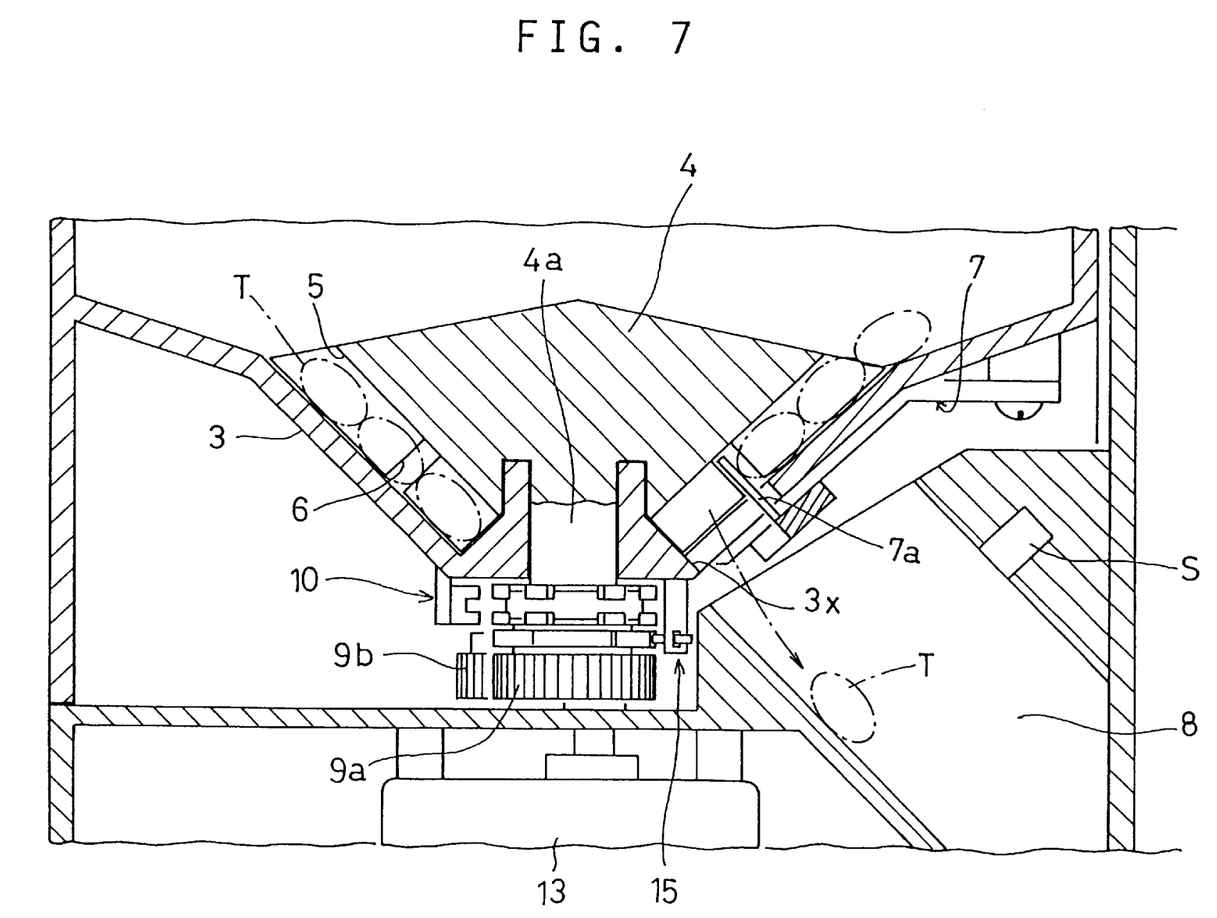
FIG. 7 is a vertical sectional view of a tablet feeder of a third embodiment.

FIG. 4 shows a sectional view of a tablet feeder constructed in accordance with a second embodiment. Sectional views taken along the section lines V—V, VI—VI are shown in FIGS. 5 and 6. The tablet feeder of this embodiment differs only in that the rotor 4 in the storage case 1 has a conical shape. Accordingly other parts have slightly different shapes. However, the stop means 10 of the first embodiment is also adopted in this embodiment. Thus, even if their shapes are slightly different, the similar members have the same function, and identical references numerals are used and their description is omitted.

The rotor is formed in a conical shape, and the bottom portion 3, is also formed in a conical shape, which corresponds to the shape of the rotor 4. The rotor is received therein so as to be rotatable about the rotary shaft 4a. On the outer circumferential surface of the rotor 4, a plurality of pockets 5 are formed along the inclined surface at angular intervals. A partitioning groove 6 is formed in the inclined surface of the rotor at a position below its middle so as to extend over the entire circumference thereof.

Small magnets 10a are provided at a plurality of locations (two in the embodiment) on the inclined outer surface of the bottom portion 3. A plurality of small magnets are also provided on the outer circumferential surface of the rotor 4 at angular intervals. The small magnets 10b are provided between the pockets 5 at the same intervals as those between the pockets. The small magnets 10a are also arranged at a corresponding interval(s).

At a position corresponding to the top opening of the discharge path 8, an opening 3x is formed in the bottom portion 3. At this position, a partitioning member 7 for partitioning tablets in each pocket 5 is fixed to the outer peripheral wall of the bottom portion 3. The structure of the partitioning member 7 is substantially the same as in the first embodiment. The predetermined position at which each pocket 5 of the rotor 4 stops is as follows.

As shown in FIG. 6B, each pocket 5 of the rotor 4 is stopped at a position at which its entire width and the outer circumferential surface of the rotor this side of the next pocket almost faces the opening 3x, which is the predetermined position. Also, the stop position is restricted by the small magnets 10a, 10b arranged so that its rear end with respect to the direction in which the pocket 5 rotates (shown by arrow) is stopped at a position slightly behind the rear end of the opening 3x. The width of the opening 3x is preferably greater than the width of the pockets 5. However, in the illustrated embodiment, it approximately coincides with the total of the width of a protrusion 4T between the pockets 5 and the width of the pocket 5 (equal to one pitch). The relation between the width of the pockets 5 and that of the opening 3x and the predetermined position stop mechanism are commonly applicable to the other embodiments.

FIGS. 7 to 10 show a tablet feeder constructed in accordance with a third embodiment. This embodiment is based on the structure of the tablet feeder of the second embodiment and has partially different portions. Thus, for functionally identical members, identical reference numbers are used, and their description is omitted. The following structural members are applicable to the tablet feeder of the first embodiment too.

Figure 8:
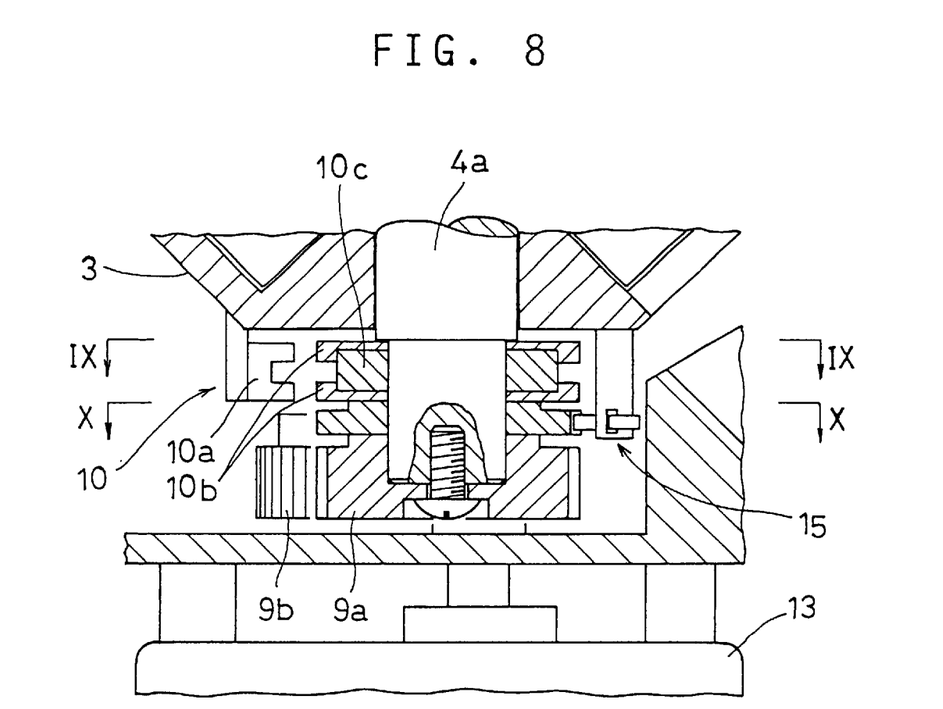
FIG. 8 is a partial enlarged view of the tablet feeder shown in FIG. 1 near the bottom end of its rotary shaft.
Figure 9:
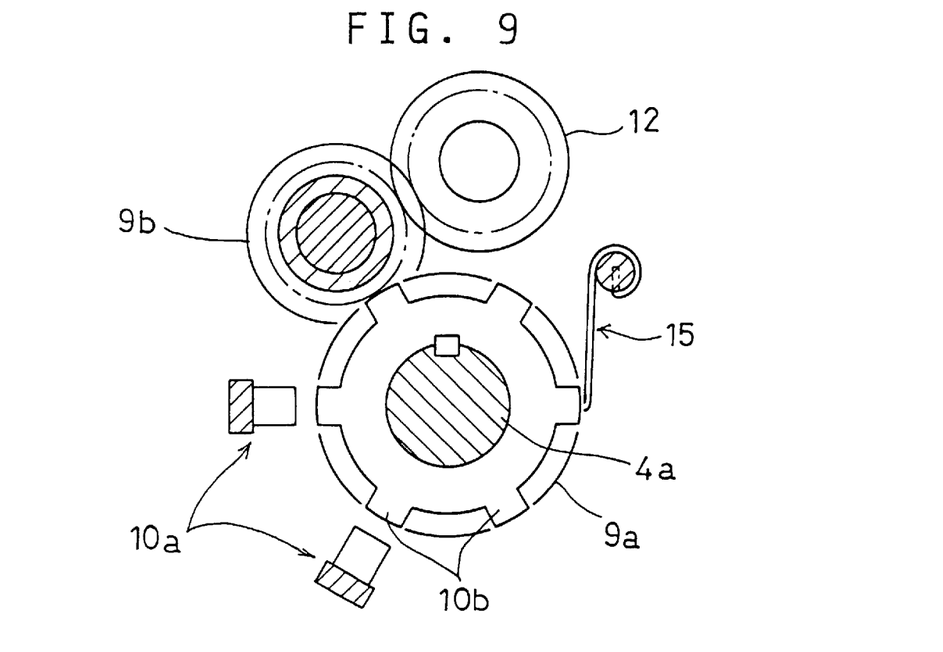
FIG. 9 is a sectional view taken along the line IX—IX of FIG. 8.

As shown in FIG. 8, adjacent the rotary gear 9a at the shaft end of the rotary shaft 4a of the rotor 4 protruding downwardly from the bottom portion 3, a predetermined position stop means 10 and a reverse turn preventive means 15 for the rotary shaft 4a are provided. The predetermined position stop means 10 comprises a plurality of (two in the embodiment) small magnets 10a fixed to the lower bottom of the bottom portion 3 at suitable positions, and a plurality of magnetizable protrusions 10b provided on a ring-shaped magnetizable plate at angular intervals.

The ring-shaped magnetizable plate comprises two metallic plates which sandwich a ring-shaped magnet 10c therebetween, so that the same polarity property is transmitted to the magnetizable protrusions 10b, and thus they are magnetized to the same polarity. This polarity is given such that it is opposite to the polarity of the small magnets 10a fixed to the bottom portion. The gaps between the small magnets 10a and the magnetizable protrusions 10b are a slight distance that will not hamper the rotation of the magnetizable plate such that when the magnetizable protrusions 10b approach positions opposite the small magnets 10a, a strong attraction force can be applied.

Also, at a radial portion where there are no protrusions of the magnetizable plate, such gaps are formed such that no strong attraction force is formed between the plate and the small magnets 10a so as not to hamper the rotation of the rotor 4. The ring-shaped magnet 10c between the magnetizable plates may be omitted. Also, if the ring-shaped magnet 10c is provided, the small magnets 10a may be magnetizable objects.

Figure 10:
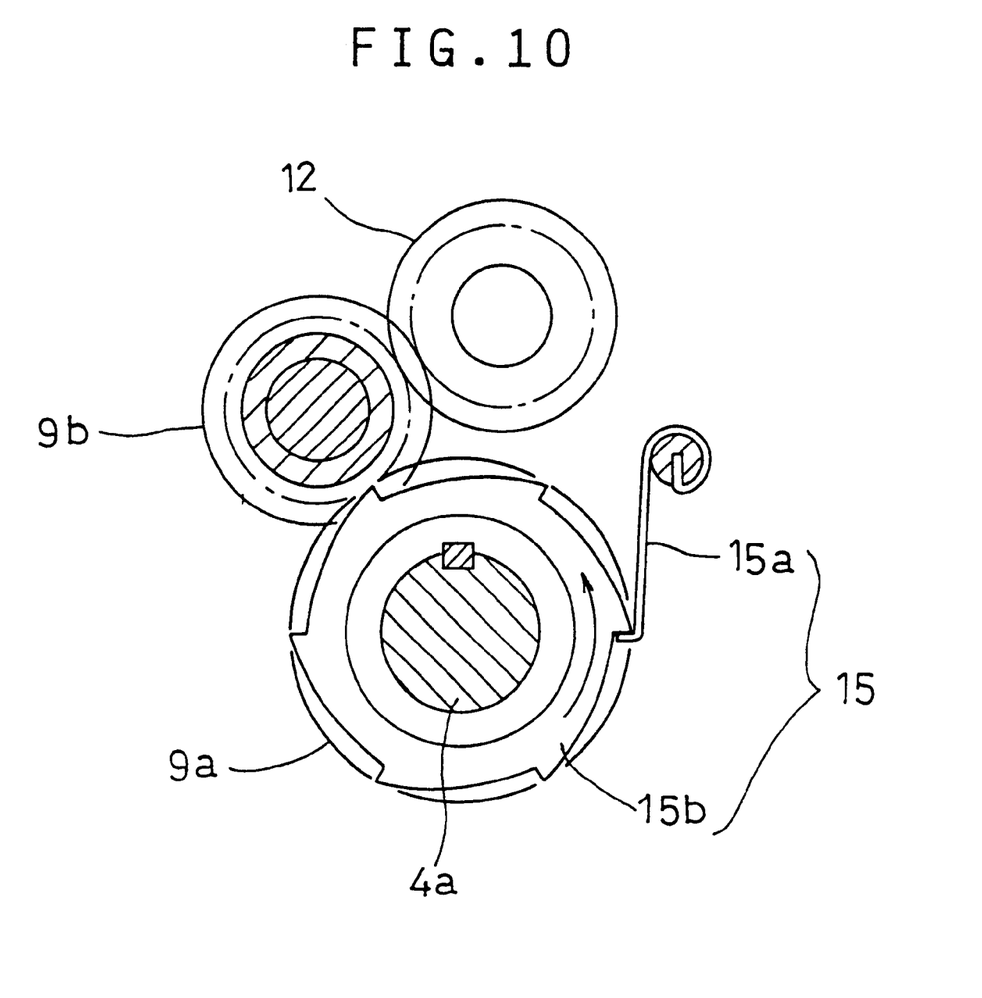
FIG. 10 is a sectional view taken along the line X—X of FIG. 8.

The reverse turn preventive means 15 comprises, as shown in FIG. 10, a ratchet plate 15b having ratchet claws, and a spring plate 15a engaging the plate 15b. It allows rotation in the direction of the arrow shown, but prevents rotation in the opposite direction. Although the direction of the arrow is opposite to the one in FIG. 5, in this embodiment, the rotation in the direction of arrow in FIG. 10 is permitted. Thus, the whisker-like resilient members 7a of the partitioning member 7 are directed in an opposite direction relative to the case of the second embodiment. Also, the reverse turn preventive means 15 is based on a system for transmitting torque from the motor through spur gears. It is not necessary in e.g. a worm gear system.

Figure 11:
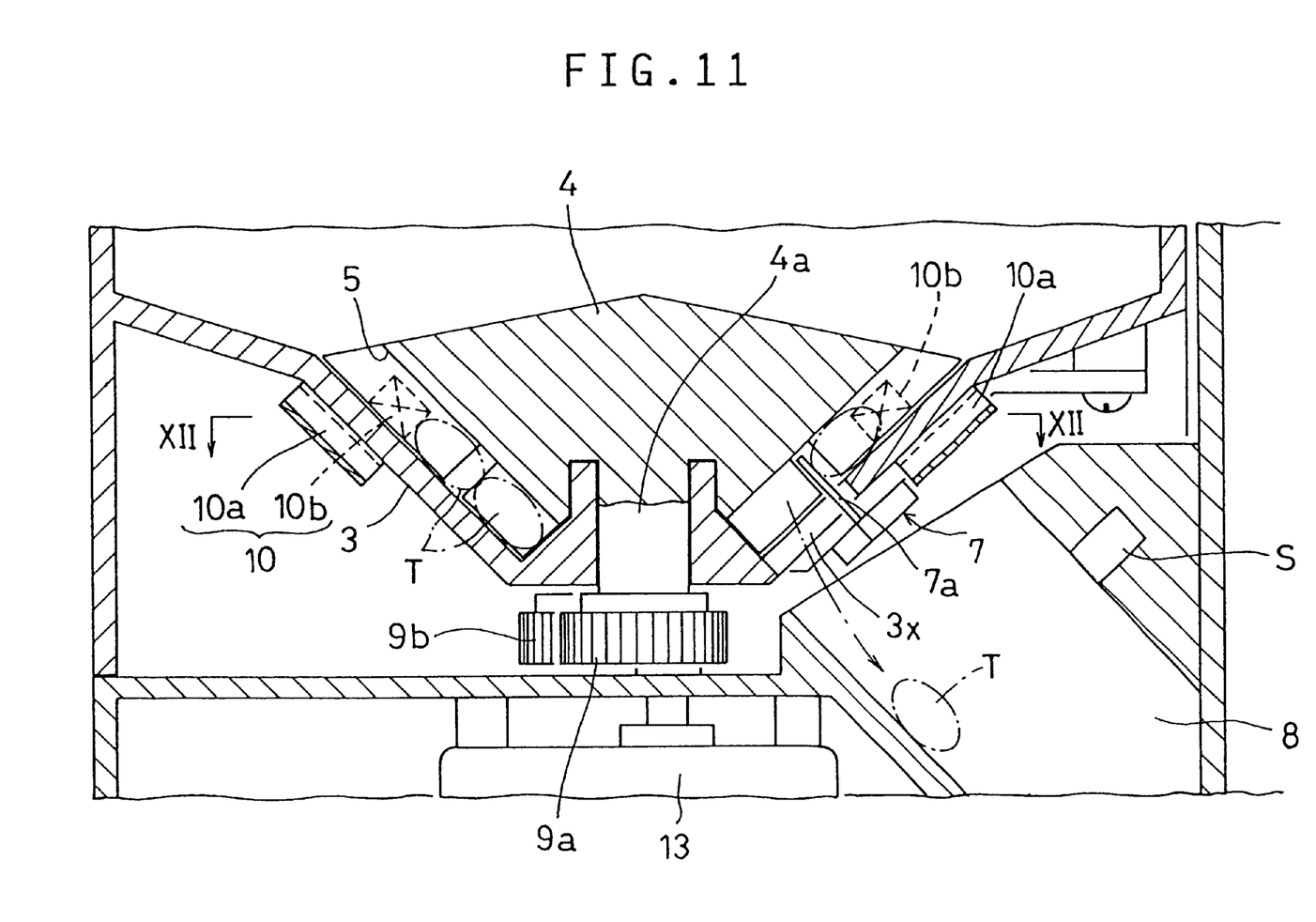
FIG. 11 is a vertical sectional view of a tablet feeder of a fourth embodiment.
Figure 12:
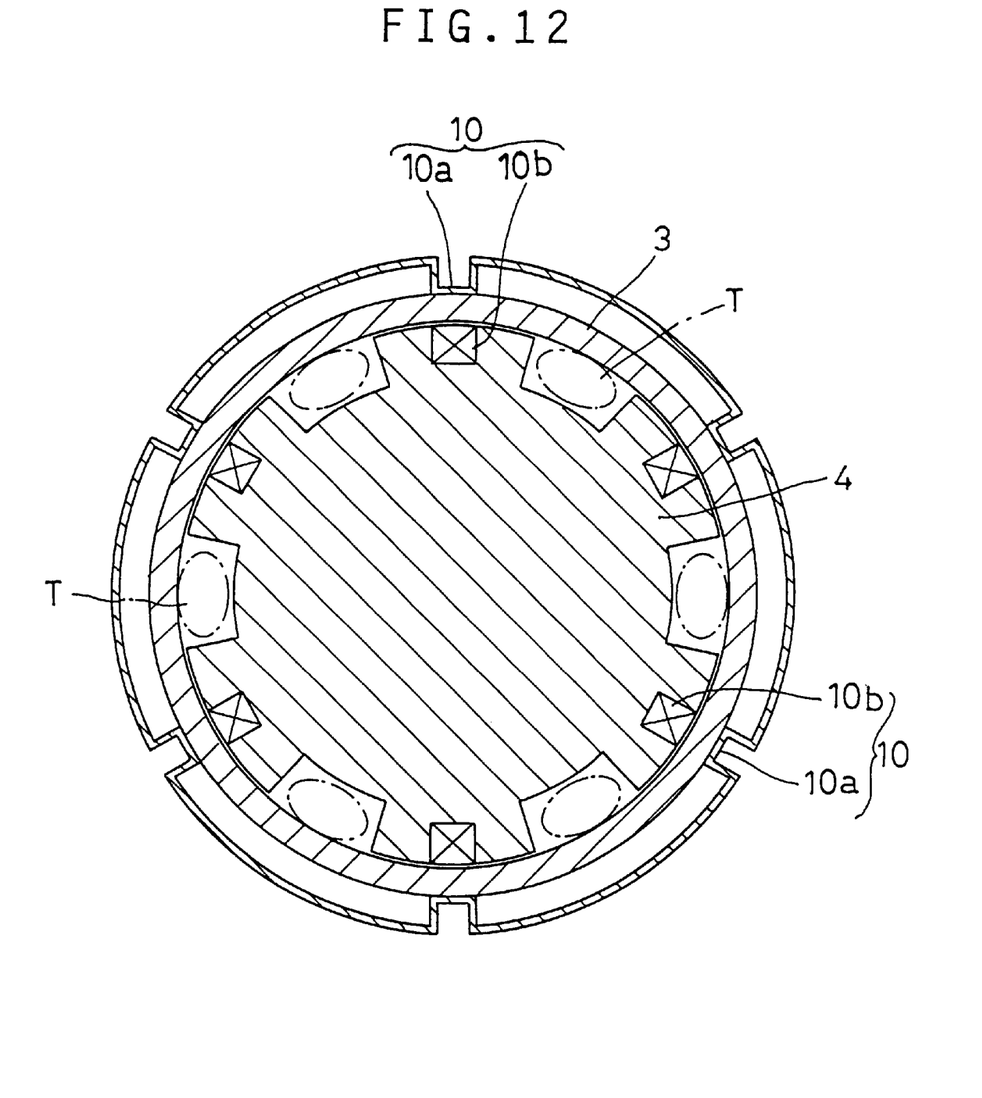
FIG. 12 is a sectional view taken along the line XII—XII of FIG. 11.

FIGS. 11 and 12 show sectional views of main portions of a tablet feeder constructed in accordance with a fourth embodiment. Although the basic structure of this embodiment is the same as the second embodiment, it differs in that the small magnets 10a provided on the bottom portion 3 are magnetizable ribs. They are formed by forming a magnetizable plate into a conical object, partially cutting it into a ring-shaped conical member, and forming the magnetizable ribs which further extend inward along the conical portion.

The magnetizable ribs 10a are, as shown, provided at a plurality of locations at equal intervals over the entire circumference corresponding to the small magnets 10b buried in the outer circumferential surface of the rotor 4 at predetermined intervals over the entire circumference, but they may be provided at two points as in the second embodiment. At least one will suffice. By forming the stop means from such magnetizable ribs 10a, it is possible to reduce the cost.

As has been described in detail thus far, the tablet feeder of this invention is designed such that when one of the plurality of pockets formed in the outer circumferential surface of the rotor in the storage case detachably mounted on the support base aligns, during rotation, with the discharge path, tablets are discharged one at a time and while the rotor is at a stop, the rotor is stopped at a predetermined position by the stop means. Thus, it is possible to completely prevent a situation in which when the storage case is dismounted from the support base, meshing of the rotary gear on the rotary shaft of the rotor shifts slightly, so that that the rotor rotates inadvertently, and tablets drop into the discharge path.

What is claimed is:

1. A tablet feeder comprising:
   a tablet storage case having a bottom portion;
   a rotor rotatably mounted in said bottom portion of said tablet storage case, said rotor being formed with a plurality of pockets for receiving tablets therein;
   a motor for driving said rotor, wherein tablets, received in said pockets, are discharged when each of said pockets comes into alignment with a discharge path provided below said rotor; and
   a predetermined position stop means for stopping said rotor at a predetermined position, wherein said stop means comprises:
      at least one first magnet or magnetizable member fixed to one of said rotor and a stationary portion of said tablet storage case,
      a plurality of second magnets or magnetizable members fixed to the other of said rotor and said stationary portion, wherein said second members are arranged circumferentially with respect to an axis of rotation of said rotor, and
      wherein upon rotation of said rotor relative to said stationary portion, said first member opposes each of said second members in succession without contacting said second members.

2. The tablet feeder as claimed in claim 1, further comprising an opening formed in said bottom portion and being located so as to aligned with said discharge path, wherein said predetermined position stop means is operable to stop said rotor at a predetermined position at which the outer peripheral surface of said rotor between two of said pockets disposed adjacent to each other faces said opening in said bottom portion.

3. The tablet feeder as claimed in claim 1, further comprising a partitioning member comprising whisker-like resilient member fixed to said bottom portion at a position adjacent said discharge path, wherein said whisker-like resilient members are mounted so as to be inclined in the rotation direction of said rotor.

4. The tablet feeder as claimed in claim 3, further comprising a reverse turn preventing means mounted on a rotary shaft of said rotor in order to prevent said whisker-like resilient members of said partitioning member from being damaged due to rotation of said rotor in a reverse direction.

5. The tablet feeder as claimed in claim 1, wherein when said first member is opposed to any of said second members, the discharge path is not in alignment with any of said pockets.

6. The tablet feeder as claimed in claim 1, wherein said first member and said second members comprise magnets.

7. A tablet feeder comprising:
   a support base defining a tablet discharge path;
   a tablet storage case mounted on said support base, said tablet storage case having a bottom portion;
   a rotor rotatably mounted in said bottom portion of said tablet storage case, said rotor being formed with a plurality of pockets for receiving tablets therein;
   a motor for driving said rotor such that when tablets are received in said pockets, the tablets are discharged when each of said pockets comes into alignment with the tablet discharge path; and
   at least one magnet provided on said bottom portion of said tablet storage case; and
   a plurality of magnets or magnetizable members fixed to said rotor and spaced circumferentially with respect to an axis of rotation of said rotor,
   wherein said magnets or magnetizable members, which are fixed to said rotor, are positioned so as to oppose said at least one magnet upon rotation of said rotor so that the rotor will always stop in a position at which said pockets are out of alignment with the tablet discharge path.

8. The tablet feeder as claimed in claim 7, wherein upon rotation of said rotor, said at least one magnet on said bottom portion of said tablet storage case opposes each of said magnets or magnetic members fixed to said rotor in succession without contacting said magnets or magnetic members.

9. The tablet feeder as claimed in claim 7, wherein said at least one magnet is mounted on an outer peripheral surface of said bottom portion of said tablet storage case.

10. The tablet feeder as claimed in claim 7, further comprising a partitioning member comprising whisker-like resilient member fixed to said bottom portion at a position adjacent said discharge path, wherein said whisker-like resilient members are mounted so as to be inclined in the rotation direction of said rotor.

11. The tablet feeder as claimed in claim 10, further comprising a reverse turn preventing means mounted on a rotary shaft of said rotor in order to prevent said whisker-like resilient members of said partitioning member from being damaged due to rotation of said rotor in a reverse direction.

12. A tablet feeder comprising:
   a support base defining a tablet discharge path;
   a tablet storage case mounted on said support base, said tablet storage case having a bottom portion;
   a rotor rotatably mounted in said bottom portion of said tablet storage case, said rotor being formed with a plurality of pockets for receiving tablets therein;
   a motor for driving said rotor such that when tablets are received in said pockets, the tablets are discharged when each of said pockets comes into alignment with the tablet discharge path; and at least one magnet provided on said bottom portion of said tablet storage case; and a plurality of magnets fixed to said rotor and spaced circumferentially with respect to an axis of rotation of said rotor, wherein said magnets, which are fixed to said rotor, are positioned so as to oppose said at least one magnet upon rotation of said rotor so that the rotor will always stop in a position at which said pockets are out of alignment with the tablet discharge path.

13. The tablet feeder as claimed in claim 12, wherein said at least one magnet is mounted on an outer peripheral surface of said bottom portion of said tablet storage case.

14. The tablet feeder as claimed in claim 12, further comprising a partitioning member comprising whisker-like resilient member fixed to said bottom portion at a position adjacent said discharge path, wherein said whisker-like resilient members are mounted so as to be inclined in the rotation direction of said rotor.

15. The tablet feeder as claimed in claim 14, further comprising a reverse turn preventing means mounted on a rotary shaft of said rotor in order to prevent said whisker-like resilient members of said partitioning member from being damaged due to rotation of said rotor in a reverse direction.

* * * * *